Aug. 12, 1969
A. S. MARTIN
3,460,749
CENTRIFUGAL SEPARATION OF LIQUID SOLUTIONS INTO FRACTIONS
HAVING HIGHER AND LOWER SOLUTE CONCENTRATIONS
Filed Nov. 13, 1967
2 Sheets-Sheet 1
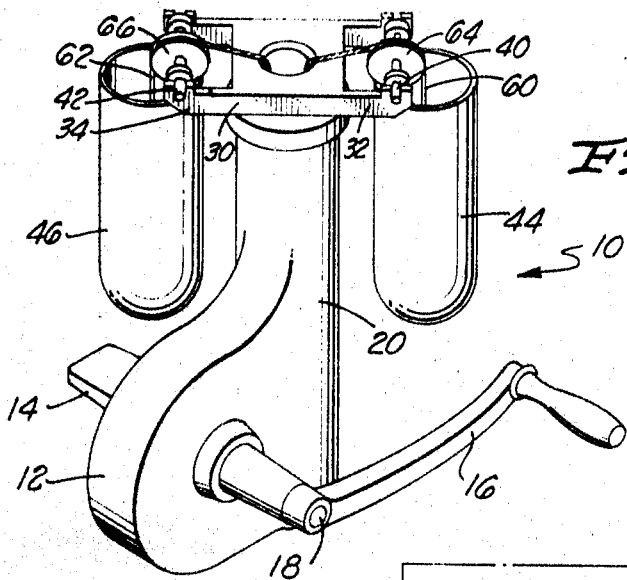
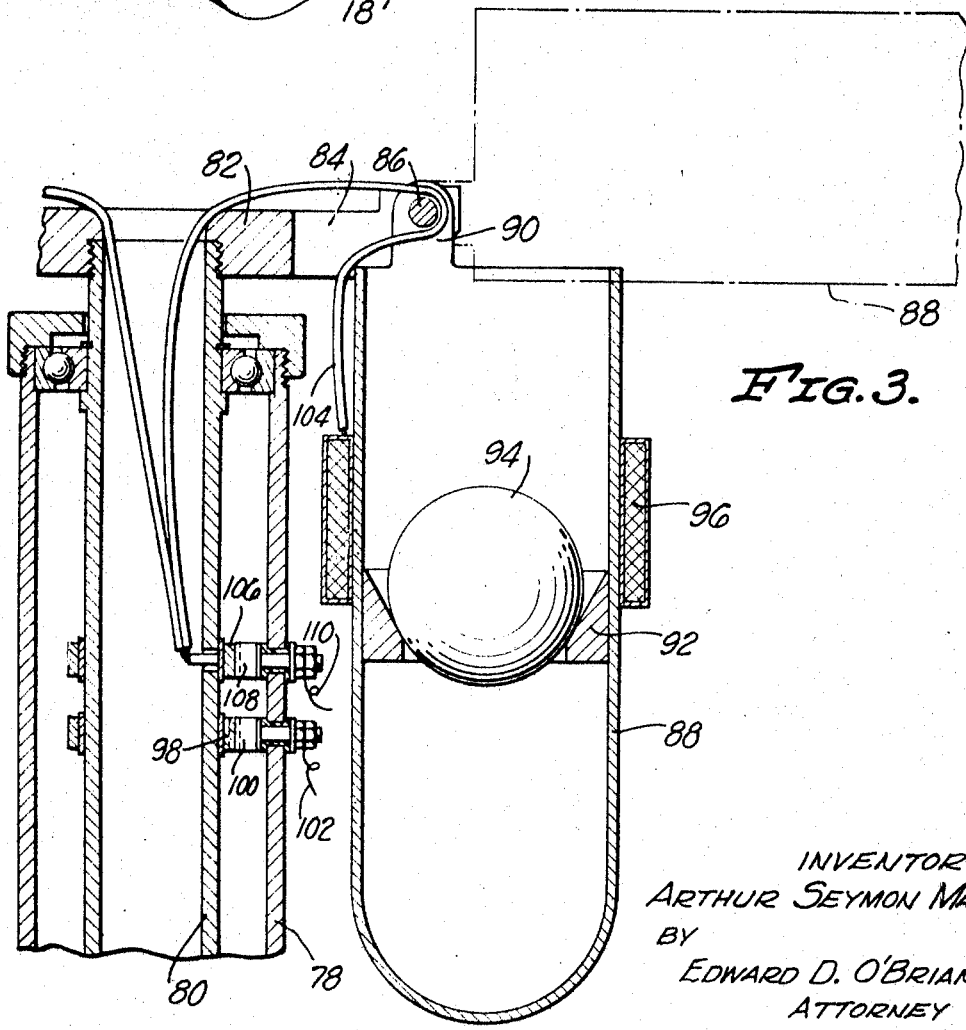
INVENTOR
ARTHUR SEYMON MARTIN
BY
EDWARD D. O'BRIAN
ATTORNEY

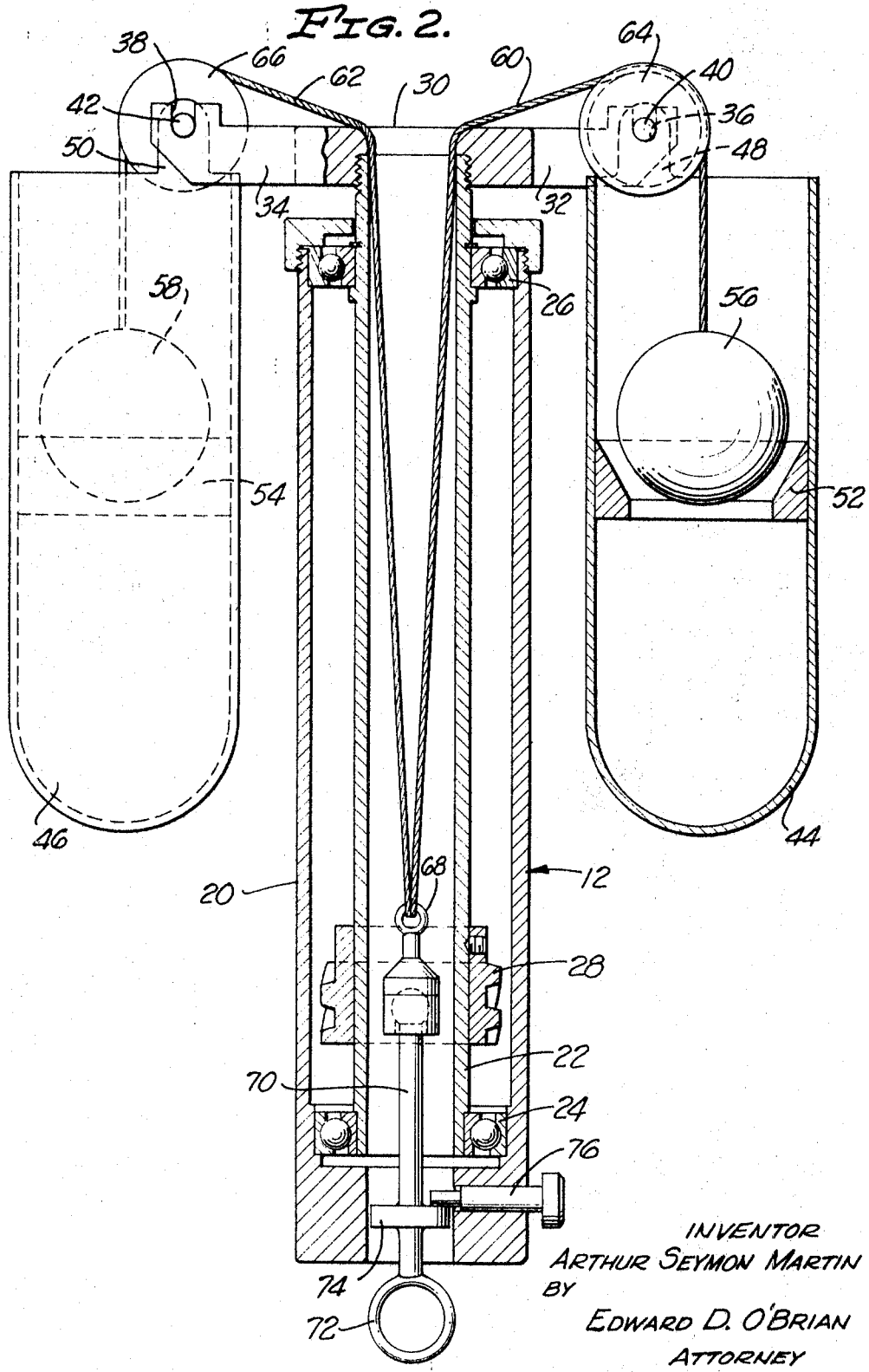

3,460,749
CENTRIFUGAL SEPARATION OF LIQUID SOLUTIONS INTO FRACTIONS HAVING HIGHER AND LOWER SOLUTE CONCENTRATIONS
Arthur Seymon Martin, 2316 French St., Santa Ana, Calif. 92706
Continuation-in-part of application Ser. No. 397,470, Sept. 18, 1964. This application Nov. 13, 1967, Ser. No. 684,593
Int. Cl. B01d 21/26, 43/00; B04b 5/02
U.S. Cl. 233—1                                   1 Claim

ABSTRACT OF THE DISCLOSURE

Unsaturated liquid solution of solute in a liquid solvent is separated into two solutions which have different concentrations of the solute in the liquid solvent by centrifuging the solution. The centrifuging results in liquid fractions in which the concentrations of the solute in the solvent are different. The separation also includes physically separating the fractions from each other while centrifuging to prevent inter-mixture of the fractions.

CROSS REFERENCE

This application is a continuation-in-part of an application Ser. No. 397,470, filed Sept. 18, 1964, by Arthur Seymon Martin, entitled Separation of Solutions, and now abandoned.

BACKGROUND

Potable water is man's basic need for the continuation of his life upon earth. Water is needed for the ordinary sustenance of man's metabolism, and it is also necessary for the sustenance of the plants and animals which furnish man's food. Any area which is short of water has a limited activity until sufficient supplies of water are made available. The expansion of habitable areas and the expansion of agricultural activity in the support of mankind is dependent upon the available water supply. This is particularly true of tremendous areas in the arid portions of the United States where the limited natural water supply is the primary cause of limited human activity.

Water is brought in from great distances by means of tremendous aqueducts to furnish sustenance for areas which otherwise could not support such a large population. Irrigation is practiced in some areas using water which is brought in by aqueducts despite the fact that local water is available. The difficulty of the local water is that its dissolved salt content is sufficient so that it is not potabe to man, and is not usable for the growing of most crops. Furthermore, the ocean is closely adjacent many arid areas, particularly the southwestern part of the United States and a number of other locations in the world.

As has been indicated above, great effort has been undertaken in the past to bring potable water to the arid areas, and some of this effort has been directed toward the desalination of unpotable water to bring it into the potable class. Past efforts have resulted in potable water, but at such a cost that the resultant water is not freely economically usable. Research is continuing along a number of different lines to reach this objective of economic potable water, but the result has not yet been reached.

SUMMARY

As an aid to understanding this invention it can be stated in essentially summary form that it is directed to the separation of unsaturated solutions of a liquid solute in a solvent. The preferred solvent-solute system is the system of water having an unsaturated solution of salt dissolved therein, for this process is particularly useful in the provision of potable water. However, this invention is not limited thereto, but is useful in other liquid solvent-solute separations. The process comprises the steps of supplying an unsaturated liquid solution, centrifuging the solution so as to separate the solution into two unsaturated liquid fractions in which the concentrations of solute in the solvent are different, and separating the fractions from one another while centrifuging the liquid solution so as to prevent inter-mixture of the liquid fractions. The number of centrifugal separations in accordance with the above can be repeated until the separation is such that the concentration of the solute or the concentration of the solute in the liquid solvent in the fraction having lesser solute concentration is to the point desired. The type of apparatus capable of making such separations is any type of apparatus wherein the separation of the fractions can be accomplished while the fractions are under the influence of centrifugal force so that inter-mixing of the fractions does not occur. In a batch type process, the centrifuge has the zone in which the solution is placed separable into two zones before centrifuging stops. This is accomplished by having a suitable valve positioned within the centrifuge chamber to divide the chamber. Similarly, appropriate structure for separating the fractions from each other during centrifugation can be accomplished in a continuous process.

Accordingly, it is an object of this invention to provide a novel process for the separation of unsaturated water solutions so that potable water is available in large quantities at an economic cost. It is another object of this invention to provide a novel process for the separation of many non-aqueous liquid solutions so that various solvent-solute systems can be economically separated. It is a further object of this invention to provide a process which includes the step of centrifuging an unsaturated solvent-solute system so as to cause an increase in the concentration of the solute in a portion of the system. Other objects and advantages of this invention will become apparent from a study of the following portion of the specification, the claim and the attached drawings.

DESCRIPTION OF THE DRAWINGS

FIG. 1 is an isometric view of a centrifuging apparatus capable of being used in the separation of solutions in accordance with the process of this invention;

FIG. 2 is an enlarged section taken generally along the center line of the structure of FIG. 1; and FIG. 3 is a section taken generally along the center line of another embodiment of the apparatus, with parts broken away.

DESCRIPTION

Referring to FIG. 1 a centrifuge suitable for the practice of this process is generally indicated at 10. The centrifuge 10 comprises fixed housing 12 which has securing means 14 by means of which the centrifuge 10 may be mounted in a fixed location. The housing 12 is fitted with a manually operable crank 16 which is connected through a shaft 18 to a large spiral gear within the housing 12.

As is seen in FIGS. 1 and 2 the housing 12 includes a vertically positioned, generally cylindrical bearing housing 20. Within bearing housing 20 is positioned the main drive shaft of centrifuge 10 which is in the form of a tubular shaft 22. Tubular shaft 22 is suitably mounted for rotation about a vertical axis upon lower anti-friction bearing 24 and upper anti-friction bearing 26. The bearings 24 and 26 are arranged to support vertical thrust loads caused by gravity, by centrifugal force by the driving mechanism. Pinion 28 is non-rotatably mounted upon shaft 22 and is positioned to engage with the drive gear mounted on shaft 18. The tooth arrangement on the main drive gear and on pinion 28 is such that when shaft 18 is rotated by means of crank 16, shaft 22 rotates about its axis at a relatively high rate, so that relatively slow rotation of crank 16 causes relatively high speed rotation of shaft 22. Other convenient driving mechanism, such as a motor, can alternatively be used.

Rotating support frame 30 is secured to the top of shaft 22 to rotate therewith. Frame 30 is positioned upon the axis of rotation and extends in diametrically opposite directions to provide a first pair of support arms 32 and a second pair of support arms 34. Each of these pairs of arms is provided with suitable bearing means so that each pair of arms is capable of supporting a centrifuge tube for rotation about the axis of shaft 22 and for rotation about the support axis. Thus, arms 32 are provided with bearing recess 36 and arms 34 are each provided with bearing recess 38. Shafts 40 and 42 are, respectively, mounted within bearing recesses 36 and 38. First and second centrifuge tubes 44 and 46 are, respectively, provided with bearing bosses 48 and 50 at their top ends. The bearing bosses 48 and 50 are provided with holes to receive the shafts 40 and 42 so that the centrifuge tubes 44 and 46 are rotatable with respect to the support frame 30 in a direction at right angles to the axis of shaft 22. Thus, when the shaft 22 is rotated, the centrifuge tubes 44 and 46 swing outwardly into a substantially horizontal plane so that the contents of the centrifuge tubes are subjected to centrifugal force.

Each of the centrifuge tubes 44 and 46 is provided with a valve seat, with the valve seat in tube 44 indicated at 52 and the valve seat in tube 46 indicated at 54. Each of the valve seats 52 and 54 is provided with a valve disc, in this case balls 56 and 58, respectively. Flexible valve operating members 60 and 62 are respectively connected to the balls 56 and 58 and pass over guide wheels 64 and 66 are rotatably mounted upon shafts 40 and 42 and are positioned so that the valve operating members are positioned centrally of the centrifuge tubes 44 and 46. The flexible valve operating members 60 and 62 pass through an opening in support frame 30 and extend downwardly through the interior of tubular shaft 22. Within tubular shaft 22 the members 60 and 62 are secured to the upper portion of a swivel 68. The lower portion of the swivel includes rod 70 which extends out of the bottom of shaft 22 and out of the bottom of bearing housing 20. Rod 70 terminates in ring 72 to permit easy grasp thereof. Flange 74 is secured to rod 70 and is positioned within bearing housing 20, which is stationary. Stop plunger 76 is movably engaged in a transverse hole in bearing housing 20 and is movable into a position where it engages flange 74 to inhibit upward motion of rod 70. In the position shown in FIG. 2 the rod 70 is held in the downward direction, and through the agency of the flexible valve operating members 60 and 62 the valve discs 56 and 58 are held off of their seats 52 and 54.

It is clear that the structure described permits the movement of valve discs 56 and 58 into engagement with and out of engagement with their respective seats while the shaft 22 is rotating. Thus, the original volume of the centrifuge tubes 44 and 46 can be selectively partitioned int two zones or volumes during operation of the centrifuge structure. This permits separation into two fractions while the fractions are under centrifugal force, in accordance with the hereinafter described process.

Another embodiment of structure useful in the practice of this process is shown in FIG. 3. Referring now to FIG. 3, a bearing housing 78 is shown. This bearing housing corresponds to the bearing housing 20 shown in FIGS. 1 and 2. Rotatably secured within the bearing housing for rotation about a vertical axis is tubular shaft 80. Shaft 80 carries the support frame 82 which is provided with a first pair of supporting arms 84, and a similar second pair, not shown. The hereinafter described structure is duplicated symmetrically about the axis of shaft 80, and accordingly only one portion is shown in FIG. 3, and it is described below. It is understood that the diametrically opposite side of support frame 82 carries similar structure. Shaft 86 is journalled in and is supported by the first pair of supporting arms 84. Centrifuge tube 88 is formed with bearing bosses 90 which are engaged by shaft 86. Thus, centrifuge tube 88 is pivoted on shaft 86 to rotate about an axis at right angles to the axis of shaft 80. Similar to centrifuge tubes 44 and 46, centrifuge tube 88 is closed at the bottom and is adapted to receive the solution to be subjected to centrifugal force.

Valve seat 92 is provided within centrifuge tube 88 and is provided with a valve disc in the form of ball 94. The valve seat-ball combination permits the centrifuge tube 88 to form a single volume subject to centrifugal force, and permits, upon closing of the valve while under the influence of centrifugal force, the separation of the centrifuge contents into two fractions.

Electro-magnetic coil 96 is positioned upon centrifuge tube 88 so that upon energization the magnetic force created thereby acts upon the first ball 94 to move it off of valve seat 92. Thus, upon energization of coil 96 the valve is opened. One side of coil 96 is grounded to the tube 88, and thus through shaft 86 and frame 82 to shaft 80. Shaft 80 carries slip ring 98 which is in electrical conductivity with brush 100. Brush 100 is insulated from bearing housing 78 and carries wire 102 to a suitable power supply. The other side of coil 96 is connected through wire 104 to slip ring 106. Slip ring 106 is insulated with respect to shaft 80 and is engaged by brush 108. Brush 108 is also insulated with respect to bearing housing 78 and is connected by wire 110 to a source of power, through a control switch. Thus, when the control switch is closed wire 110 is energized and the coil 96 causes the ball 94 to move off of its seat 92. Furthermore, when coil 96 is not energized gravity and centrifugal force causes ball 94 to engage in its seat 92 to separate the centrifuge tube into two zones. The valve represented by seat 92 and ball 94 may be opened and/or closed while the centrifuge of FIG. 3 is stationary, or while it is in motion.

The above described exemplary apparatus is useful in the centrifugal separation of an unsaturated solvent-solute system into a fraction having a greater density of solute and a fraction having a lesser density of solute. Many other structures are useful in such a process, but the process is characterized by the separation of the fractions while under centrifugal force to prevent inter-mixing of the fractions because of thermal motion. The prime example of separation of considerable utility is the separation of an unsaturated solution having water as the solvent and sodium chloride as the solute.

Intermolecular relationship in gases is characterized by molecular collisions as the molecules travel along their free paths. Molecular velocity in such gases, and the number of resultant collisions, is characterized by the energy in the gas and this characterizes the temperature thereof. In solids, intermolecular relationship is characterized by lattice structures in which each molecule occupies its position in the lattice and is maintained therein by intermolecular forces. Impurities in the solid material provide lattice discontinuity because impurity molecules are of different size than the basic molecules. However, the impurities occupy lattice positions and the intermolecular forces in the lattice also act upon the impurity molecules. It is important to note that the impurities are part of the solid lattice and are held in place therein by intermolecular forces.

However, liquids occupy an in-between position on the scale of orders. It is clear that liquids are more closely related to solids, because of the fact that liquid density approaches that of the solid. This implies substantially the same molecular spacing as in the solid form. However, because of the low shear in liquids it is equally clear that the inter-molecular bonding of solids is not present.

Present theory of liquids states that molecules are arranged in a space packing relationship which is a quasi-lattice structure in which the molecules are packed similarly to a solid lattice, but with considerably lower intermolecular forces. This space packing is about as efficient as the packing in the solid lattice structure, and thus densities reach the same order of magnitude. Dissolved solutes in liquid solvents have their molecules positioned among the solvent molecules in the space packing relationship. Apparently, there is a certain limit to the number of solute molecules which can lie in proper space packing of the solvent. Any excess above this number cannot dissolve and the maximum number in the space packed liquid represents the saturated solution. In the saturated case, it is clear that since the maximum number are present, there can be no mobility of the impurity or solute within the solvent or primary group of space packed molecules. However, in the pure liquid case, since the entire structure is space packed there can be a certain amount of molecular position interchange between the space-packed molecules of a pure liquid. Furthermore, in the unsaturated solution case, there can be a certain mobility of impurity or solute molecules among the solvent molecules. Normal mobility in this case is driven by the temperature of the solvent-solute system and is fairly random. Thus substantially equal dispersion occurs more rapidly at higher temperatures. It must be noted that in such solvent-solute systems that since they are different, either the molecules of solvent or the molecules of solute must be heavier. In the case of water-sodium chloride, it is the sodium chloride that has the heavier molecules. From these considerations it is clear that the application of an adequate force for proper length of time can cause an increase in the amount of solute in one portion or fraction of the solution accompanied by a decrease in solute in the other fraction.

It was discovered that the application of a fairly low force, in the order of upwards from 200 times the force of gravity is capable of causing separation of unsaturated water-sodium chloride solutions into two fractions respectively having lesser and greater concentrations of the solute in the solvent than in the original solution. The only requirement is that the minimum force applied must be greater than the random forces, primarily thermal, which cause dispersion. Thus, the minimum amount of force which can be effectively applied is temperature dependent. Above that minimum, the application of more force causes a quicker separation and a separation into fractions which have a greater difference in solute concentration. The maximum amount of force is an economic limit, and is not huge. However, it is clear that the fraction having the higher concentration of solute can become saturated only in theory, for the saturated condition is the limiting condition and no more solute molecules can be space packed into that fraction. Further application of force in such a condition would not be effective. The time of applying the force is also of importance, for enough time must be allowed to permit the motion of the solute molecules through the space packed liquid solvent structure. A convenient way of applying the necessary force is through centrifugation, such as by the apparatuses described above.

While it is clear that this separation process is useful on other solute-liquid solvent combinations, for the purpose of this example the water-sodium chloride solution will be used as an example of the solvent-solute relationship. The original solution is of substantially uniform dispersion of unsaturated solute in liquid solvent and is substantially free of non-dissolved material. After centrifuging at a sufficient speed for a sufficient length of time the original solution is divided into two liquid solution fractions which are radially separated. It is understood that radial separation in this sense is in the light of and the terms of the direction of centrifugation. The separation in fractions occurs while centrifuging of the solution continues so as to prevent inter-mixture of the fractions as centrifuging stops.

EXAMPLE I

A room temperature solution having a volume of about one cubic inch and a concentration of 32,000 parts per million of sodium chloride in water was placed in a centrifuged. This is an unsaturated solution. The solution was substantially free of non-dissolved material. The centrifuge tube had a sufficient volume to accept the volume of solution. The centrifuge was rotated at 1800 r.p.m. for ten minutes. The mean radius of the solution from centrifuge axis was 3 inches. After centrifuging for that length of time, the solution was separated into two fractions while under centrifugal force. Upon analysis, the fraction at the lesser radius showed a concentration of the solute of about 60% of the original concentration. This fraction had a volume of about ⅛ cubic inch. These test results were repeated in a subsequent experiment.

EXAMPLE II

An unsaturated solution was made up by dissolving 4 ounces of rock salt, primarily sodium chloride, in one gallon of water. This solution was at room temperature. It was placed in a centrifuge and was centrifuged at about 11,000 r.p.m. for about 30 minutes. The radius of the solution was about 4 inches. After about 30 minutes of centrifugation, the fractions were separated while under centrifugal force. Tests showed that the fraction at the lesser radius had a lesser concentration of solute than the fraction of the greater radius.

It is clear that further centrifuging steps would reduce the amount of solute in the first fraction until the water therein was of potable character.

There remain several other theories on the structure of water. Each of these theories concerns itself only with pure water, for without a theoretical understanding of pure water, the theory of water with a solute therein cannot be rationally attacked.

The uniform liquid model theory treats water as essentially an unstructured liquid with no local structural domains that are different from those of any other arbitrarily chosen volume elements in the water. In other words, in the process of averaging, the individual water molecule behaves at any time in much the same manner as any other water molecule at that time. Because—until very recently—Raman spectroscopy has been unable to delineate definite structures within liquid water, most experimental spectroscopic results have tended to favor the uniform liquid model.

But recently, spectroscopic evidence—Raman, nuclear magnetic resonance, neutron diffraction and the new harmonic scattering—all indicate that water is probably a mixture.

These mixture models admit the simultaneous existence of at least two states of water—a bluky species representing some type of structured unit and a dense species such as monomeric water molecules. The mixture models are divided into three more or less arbitrary categories: (1) ice-water in which ice-structure units are in equilibrium with monomers; (2) clusters of molecules which are in equilibrium with monomers; (3) and clathrate-like cages in equilibrium with monomers. In each of these cases the structures collapse and reform, perhaps $10^{11}$ times a second.

Each of these theories permits centrifugation of solute molecules out of the water structure. All that is necessary is the application of sufficient force to move the solute through the water structure, against the forces tending toward substantially uniform dispersal, to obtain fractions having greater and lesser concentrations of solute. The forces given in the above examples are sufficient. The maximum amount of force applied in an economic limit, and is presently believed to be well within two orders of magnitude above the minimum value.

I claim:
1. The process of separating an unsaturated liquid starting solution comprising liquid water solvent and at least one solute principally comprising sodium chloride dissolved in said liquid water solvent into two fractions in which the concentrations of said solute in said water solvent are different and wherein said starting liquid solution is substantially free of undissolved material, which process consists essentially of:
  centrifuging said liquid starting solution with an adequate force for an adequate length of time so as to separate said solution into first and second liquid fractions in which the concentrations of said solute in said liquid water solvent are different, and in which the solute is unsaturated; and
  separating said fractions from one another while maintaining centrifugal force upon said fractions at least until said fractions are separated from one another so as to prevent inter-mixture of said fractions.

References Cited

UNITED STATES PATENTS

| | | | |
|---|---|---|---|
| 2,422,882 | 6/1947 | Bramley | 233—1 |
| 2,616,619 | 11/1952 | MacLeod | 233—18 |
| 3,096,283 | 7/1963 | Hein | 233—20 |
| 3,309,016 | 3/1967 | O'Brien | 233—11 XR |
| 3,255,805 | 6/1966 | Bechard | 233—11 XR |

OTHER REFERENCES

Chemical and Engineering News, vol. 37, No. 5, Feb. 2, 1959, pp. 40 and 41, article entitled "Research."

German printed application 1,014,348, August 1957.

HENRY T. KLINKSIEK, Primary Examiner

U.S. Cl. X.R.

23—269, 312; 233—18, 20